Feb. 8, 1938. R. S. WHITTINGTON 2,107,724
AUTOMATIC CLUTCH CONTROL DEVICE
Filed Aug. 29, 1932 2 Sheets-Sheet 1
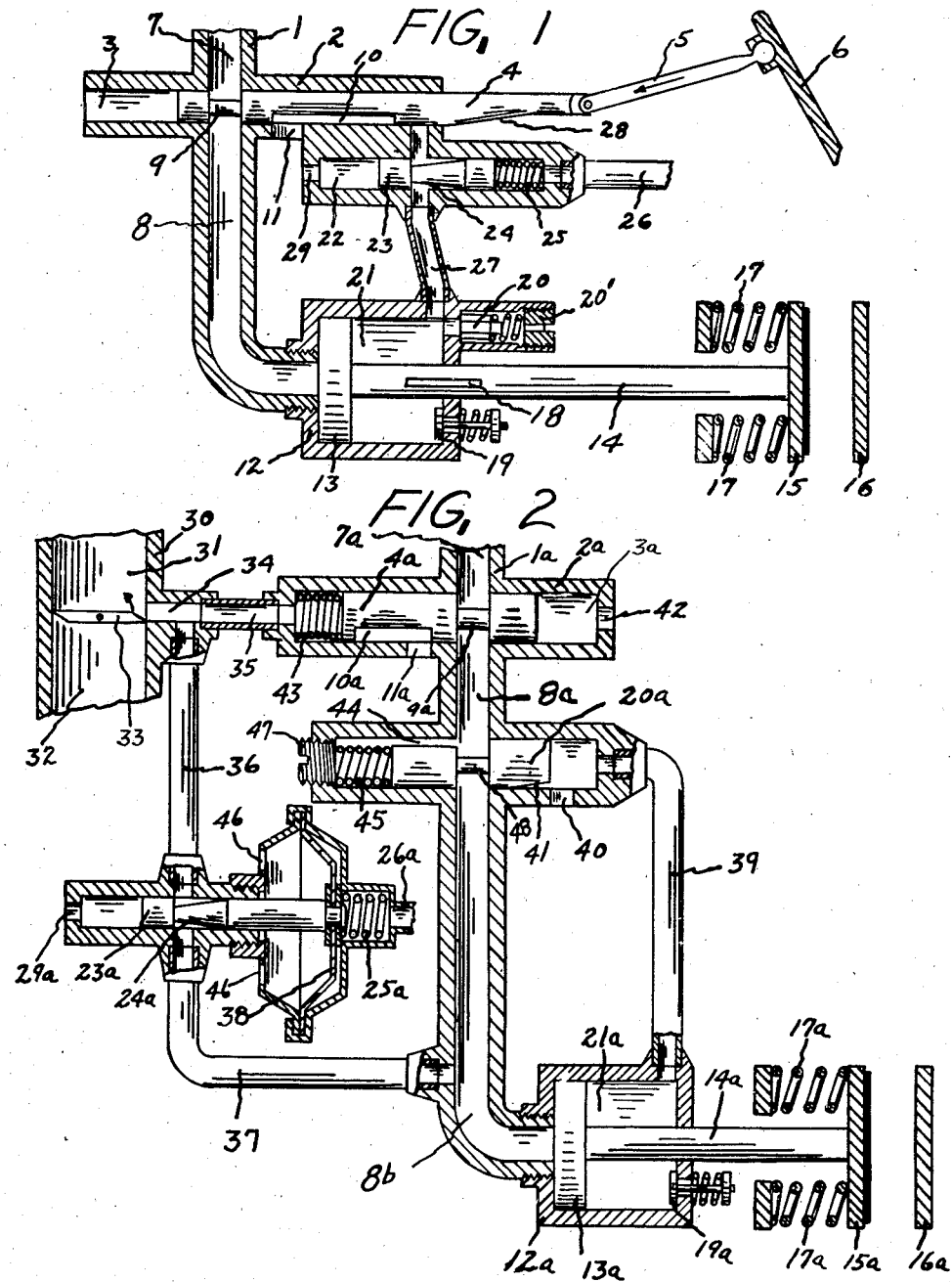
INVENTOR.
Ralph S. Whittington

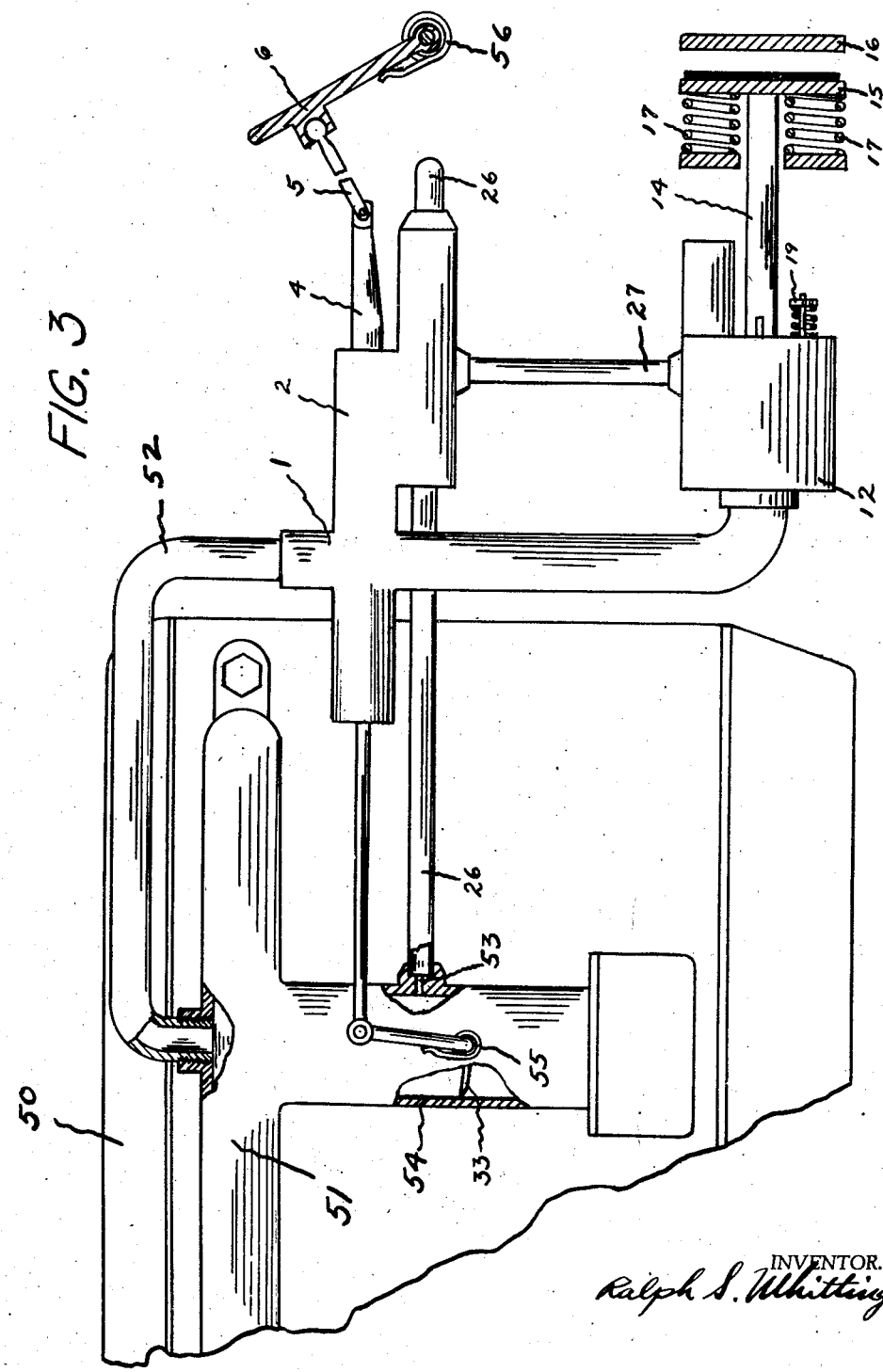

Patented Feb. 8, 1938

2,107,724

UNITED STATES PATENT OFFICE 2,107,724

AUTOMATIC CLUTCH CONTROL DEVICE

Ralph S. Whittington, Oak Park, Ill., assignor to Bendix Products Corporation, South Bend, Ind., a corporation of Indiana Application August 29, 1932, Serial No. 630,861

17 Claims. (Cl. 192—.01)

This invention relates to vacuum operated automatic control means for use in actuating the clutch of an automotive vehicle or the like.

The primary object of this invention is to provide a control means of the above mentioned character which provides automatic control of the clutch plates at their initial contact when clutch engagement is being made, and thereby insure proper clutch engagement.

A further object of this invention is to provide a control means that requires the minimum of adjustment after it is installed on the vehicle, and to provide simple adjustments where they are necessary.

Still further this invention provides a control means of the above mentioned character which can readily be adapted to systems now in production, thus greatly improving the action of such systems with the minimum changes in construction.

This invention further provides a means adaptable to such a system of controlling the clutch plate pressure during the period of clutch engagement by the position of the accelerator or throttle valve.

Numerous other objects and advantages will become more apparent as the following description proceeds, particularly when reference is had to the accompanying drawings.

Fig. 1 is a semi-diagrammatic view partly in section of a control means constructed in accordance with this invention.

Fig. 2 is a semi-diagrammatic view partly in section of a modified form of the control means illustrated in Fig. 1.

Fig. 3 is a semi-diagrammatic view partly in section showing how the system of Fig. 1 is connected to the motor of the vehicle.

In general this invention provides means for automatically releasing and engaging the clutch of a motor vehicle by the use of intake manifold vacuum, controlled by the accelerator or by the actuation of the throttle valve, thereby making it unnecessary to depress the clutch pedal manually while shifting the gears of the transmission, and also provides the vehicle with free wheeling.

In devices now in production of the above character using a power cylinder to actuate the clutch, the clutch plates are arrested in their motion toward engagement by the closing or restriction of the air passage allowing the clutch to move toward engagement at the proper time. This method necessitates accurate control of the dimensions of a number of parts, and as soon as the clutch plates wear, adjustments that have proven to be very delicate must be made.

This invention provides a check valve sensitive to the pressure developed in the power cylinder by the clutch springs to restrict or stop the motion of air from the power cylinder at the initial engagement of the clutch.

This invention also provides that the above check valve may close the vacuum side of the power cylinder from the atmosphere at the initial engagement of the clutch, thereby making possible the complete control of the clutch plates during their final engagement by the use of suction and air inlet connections to the vacuum side of the power cylinder, controlled either by the throttle valve or by an accelerator operated valve.

Referring then to the drawings there is shown in Fig. 1 a system composed of a conduit 1 which is adapted to be connected to the intake manifold of the motor of the vehicle with which the system is associated. The conduit 1 is provided with lateral extension 2 which contains the bore 3 which slidably receives the plunger 4. Plunger 4 is connected by a suitable linkage 5 to the accelerator pedal 6. Plunger 4 divides conduit 1 into passages 7 and 8 and controls communication between passages 7 and 8, and between passage 8 and the atmosphere by virtue of reduced portion 9 of plunger 4, groove 10 in plunger 4, and port 11 in extension 2. The end of conduit 1 is tapped into the power cylinder 12 which slidably receives the piston 13. Piston 13 is operatively connected by pull rod 14 to the clutch plate 15 which is actuated to engage clutch plate 16 by clutch springs 17. The pull rod 14 is further provided with the groove 18. Inlet check valve 19 and outlet check valve 20 communicate with chamber 21 of the power cylinder 12. Plug 20' adjusts the pressure at which check valve 20 opens.

Extension 2 also contains the bore 22 which slidably receives the piston 23. Piston 23 is provided with the taper 24, and is actuated by spring 25, and by vacuum acting thru the conduit 26 which is adapted to be connected to the intake manifold at a point where vacuum in induced by the speed of the motor.

Chamber 21 of power cylinder 12 is provided with an outlet thru a conduit providing the passage 27 to the atmosphere controlled by the taper 24 of valve 23 and by the plunger 4 and its taper 28.

In Fig. 3 the relation of the motor of the vehicle to the system of Fig. 1 is shown. The motor of the vehicle is denoted by the numeral 50, and the intake manifold by the numeral 51. The conduit 52 provides a passage from the conduit 1 to the manifold 51. The conduit 26 is tapped into the intake system at the port 53. The spring 55 is secured to the manifold and urges the throttle valve 33 to a closed position as shown in Fig. 3. The spring 56 urges the accelerator pedal 6 to the released position as shown in Fig. 3.

In Fig. 1 all parts are shown as they are while the motor idles. Vacuum is present in the intake system, and while the accelerator pedal 6 is released this vacuum can act past the plunger 4, by virtue of the reduced portion 9, and thru passage 8 to the piston 13 reciprocating in the power cylinder 12. This allows atmospheric pressure acting thru check valve 19 to force piston 13 to the position shown in Fig. 1 and release the clutch.

On the actuation of the accelerator pedal 6 the plunger 4 is moved forward closing off the vacuum in passage 7 and opening passage 8 to the atmosphere thru groove 10 in plunger 4 and port 11 in extension 2. The linkage to the throttle valve is such that the motor is properly accelerated by this action.

Atmospheric pressure is now present in passage 8, and the clutch springs 17 can now force the clutch toward engagement by forcing the air in chamber 21 thru the check valve 20. However at the initial engagement of the clutch, the decrease in tension of clutch springs 17 causes a drop in pressure in the chamber 21. This drop in pressure allows check valve 20 to close, arresting the motion toward engagement of the clutch.

A drop in pressure within the chamber 21 occurs as soon as the clutch plates 15 and 16 engage because the tension of springs 17 which has been exerted on pull rod 14, begins to be transferred against the plate 16. It is obvious that after the clutch completely engages there will be no tension in pull rod 14, and hence no tendency to build up a pressure in chamber 21. This explains why there must be a drop of pressure in chamber 21 at the initial clutch engagement, and when this drop in pressure occurs, check valve 20 closes, preventing the clutch from completely engaging at this time. This is true only if the accelerator pedal 6 is slightly depressed so that passage 27 is still closed. However, if pedal 6 is depressed far enough to bring taper 28 of piston 4 in register with passage 27, then the clutch engagement will only be retarded by the closing of check valve 20.

The groove 18 in pull rod 14 is optional, but can be used to provide an additional outlet from the chamber 21 during the greater portion of the motion toward engagement of the clutch. Groove 18 does not determine the point at which the clutch is arrested, but check valve 20 does this at the initial engagement of the clutch. Groove 18, if used, should be arranged so that it closes the air outlet from chamber 21 enough before the initial engagement of the clutch to insure that check valve 20 will always control the intial engagement of the clutch.

There is always some wear of clutch parts and linkage, and also some variation in the assembly of these parts. Hence if groove 18 is used it should be arranged to close the exit from chamber 21 soon enough that any normal wear of parts or variation in assembly would not allow the groove 18 to remain open long enough to allow even partial clutch engagement, for this would interfere with the correct functioning of valve 20.

Groove 18, when it is in register with the end of cylinder 12, as shown in Fig. 1, forms an outlet from chamber 21. But as the clutch moves toward engagement, the groove 18 moves out of chamber 21 closing this exit of air from chamber 21. It is desirable for this to happen before the engagement of the clutch so that the valve 20, the passage 27, valve 23 and valve 4 will control the engagement of the clutch as described. Also the groove 18 should close the exit of air through groove 18 from chamber 21 a sufficient distance before the engagement of the clutch to insure that the groove 18 will always be closed before the engagement of the clutch regardless of the exact length of the pull rod 14 and location of groove 18. This is advisable since certain variations in the manufacture and assembly of such parts will occur. Likewise the clutch plates will wear during the life of the vehicle and it is therefore undesirable to have the groove 18 function at the initial engagement of the clutch. The purpose of groove 18 is to provide an outlet of low resistance from chamber 21 during the first part only of the motion of the clutch toward engagement. After the groove 18 closes, air escapes from the chamber 21 though the valve 20 until this valve closes at the initial engagement of the clutch due to the decrease in pull of the clutch springs 17 on the pull rod 14, and the corresponding drop of pressure in chamber 21. Thus valve 20 acts to automatically arrest the motion of the clutch toward engagement at the initial engagement of the clutch.

An accelerator pedal 6 is depressed, the taper 28 of the plunger 4 moves into register with passage 27 thus completing an air outlet from the chamber 21. Therefore clutch engagement can be completed at a rate increasing as the accelerator 6 is depressed.

The valve 23 further controls the capacity of the passage 27. This valve is not necessary to an operable system, but makes possible a good clutch engagement when the throttle is suddenly opened wide for a rapid standing start, and also insures the proper clutch engagement while shifting the gears of the transmission at any speed.

Conduit 26 is tapped into the intake system at the port 53, Fig. 3. Thus at a motor idle or while the motor is operating with the throttle valve but slightly open, the vacuum in conduit 26 will be sufficient to hold valve 23 in the position shown in Fig. 1, and hence taper 24 of the piston 23 will not restrict the passage 27. However, when the throttle valve is open and the motor speed is slow, the vacuum in conduit 26 will be low and the spring 25 will move the valve against atmospheric pressure acting through port 29, and then taper 24 on piston 23 will have moved to restrict the passage 27. As the speed of the motor is increased, vacuum will be generated in the intake system at the point the conduit 26 opens into the intake system due to the velocity of gas passing through the intake system. Thus vacuum will exist in the conduit 26 even when the throttle valve of the motor is open. The result is that atmospheric pressure acting through port 29 on piston 23 will overcome spring 25 and begin to move taper 24 out of register with the passage 27 and hence decrease the resistance of passage 27. The faster the motor speed the greater will be the motion of the piston 23 in this direction, and piston 23 will move until at some pre-determined speed the valve will occupy the position shown in Fig. 1 regardless of the fact that the general vacuum condition in the intake system is very low.

However, while shifting the gears of the transmission vacuum will be present in conduit 26 due to the velocity of gas in the intake system. This vacuum will increase with the motor speed for any setting of the throttle valve, and hence the faster the motor is turning, the less the restriction of passage 27 will be due to the taper 24 on valve 23, and the action of atmospheric pressure thru port 29. Therefore the faster the motor is turning, the faster the final engagement of the clutch will be made. This action has been found to be desirable.

In Fig. 2 is illustrated a slightly modified form of the system shown in Fig. 1. Here direct connection to the accelerator pedal is eliminated.

The carburetor riser 30 is divided into passage 31, adapted to be connected to the intake manifold, and passage 32, adapted to be connected to the carburetor, by the throttle valve 33. Port 34 formed in carburetor riser 30 communicates with bore 3a thru passage 35 and with passage 8b thru conduit 36, valve 23a and conduit 37. Diaphragm 38 and spring 25a actuate valve 23a. Check valve 20a is actuated by spring 45 which is adjusted by plug 47. Valve 20a is arranged to close passage 8a from passage 8b at a predetermined drop in pressure in chamber 21a. Conduit 39 provides an outlet from chamber 21a thru port 40, which is restricted by the taper 41 when check valve 20a closes.

In the operation of the system, vacuum from passage 31 acts thru port 34, while the motor idles, and on plunger 4a allowing atmospheric pressure acting thru port 42 of extension 2a to overcome spring 43 and move plunger 2a to the position shown in Fig. 2. Then by virtue of reduced portion 9a of plunger 4a, vacuum acts past plunger 4a to passage 8a, and thru groove 44 of check valve 20a. This allows atmospheric pressure acting thru port 40, and also thru check valve 19a and conduit 39, to overcome spring 45 and hold valve 20a in the position shown in Fig. 2. Then a direct path is provided from the intake manifold to the power cylinder 12a allowing atmospheric pressure acting thru check valve 19a to move piston 13a to the position shown in Fig. 2 thereby releasing the clutch. Upon the actuation of throttle valve 33 to accelerate the motor, less of the area of port 34 is exposed to vacuum in passage 31 and more of its area is exposed to near atmospheric pressure in passage 32. Thus vacuum will drop in conduit 35 as the throttle valve is opened, and the size and shape of port 34 as well as the spring 43 and other related parts are so arranged that spring 43 closes plunger 4a at the correct motor speed. Thus vacuum from passage 7a is shut off, and atmosphere is admitted to passage 8a by virtue of port 11a in extension 2a and groove 10a in plunger 4a. Atmosphere also passes to passage 8b by virtue of reduced portion 48 of valve 20a. Then the clutch spring 17a by their pull on the pull rod 14a create a pressure in the chamber 21a which is transferred thru conduit 39 to check valve 20a, holding it partially open while the clutch moves toward engagement by virtue of the air outlet thus provided by the port 40. The pressure developed in the chamber 21a, before the clutch plates have engaged to any degree, exerts a force on the valve 20a greater than the force of spring 45, and hence by having the proper restriction of the port 40 formed by the taper 41 and by forming the port 40 the proper size in relation to the volume of air to be released from chamber 21a, the valve 20a can be held in approximately the position shown in Fig. 2, until the clutch plates partially engage, at which time the valve 20a will be forced to the right by the spring 45. The capacity of conduit 39 should be comparatively large so that only a small pressure drop will take place in it. Then more pressure will be available at the valve 20a to force it open as shown in Fig. 2. The greater part of the pressure drop between the chamber 21a and the atmosphere must take place at the port 40 and the taper 41, and this pressure drop in relation to the area of the end of valve 20a will be equal to the force of spring 45 at the position the valve 20a will assume as the clutch moves toward its initial engagement. Further, this position of valve 20a will allow communication between passages 8a and 8b until the initial clutch engagement.

In regard to the cross sectional area of port 40, this port is preferable not round but rectangular so that its area will be less than the area of the conduit 39. However the shape of port 40 is optional, but its area must be less than that of the conduit 39. However, at the initial engagement of the clutch plates, there is a drop in pressure in the chamber 21a due to the decrease in tension in the clutch springs 17a, and this drop in pressure is transmitted to the check valve 20a, allowing spring 45 to close check valve 20a at the initial clutch engagement. Air is still allowed to escape from chamber 21a by virtue of the taper 41, which decreases the capacity of port 40 as the check valve 20a closes, but still provides for a final clutch engagement equal in speed to the maximum requirements of the system.

As soon however as the check valve 20a closes, passage 8a is closed from passage 8b, making further motion of piston 13a dependent on conditions in conduit 37.

Port 34, spring 43 and other related parts are also arranged so that the vacuum in conduits 36 and 37 is of sufficient magnitude to hold the piston 13a at approximately the position it has when check valve 20a closes, but not great enough in magnitude to completely release the clutch. Then as the throttle valve 33 is opened further, there is a corresponding drop in vacuum in conduits 36 and 37 which will cause a further engagement of the clutch, and if the throttle valve is partially closed, there will be an increase in vacuum in conduits 36 and 37 partially releasing the clutch. Thus the clutch plate pressure depends on the position of the throttle valve 33 while it passes the port 34.

The conduit 26a is tapped in to the intake system at a point where vacuum is induced by the velocity of gas in the intake system, and the function of the valve 23a is the same as the valve 23 of Fig. 1. Here the diaphragm 38 is used to actuate the valve 23a thereby producing a greater force to move the valve for a given vacuum. When the motor speed is low and the throttle is opened, vacuum in conduit 26a is low, giving a high restriction to the air passage from port 34 to the passage 8b, thereby producing a slow final engagement of the clutch. But when the motor speed is fast there is a vacuum in conduit 26a even when the throttle is wide open and this vacuum will increase as the motor speed increases. Consequently, the faster the motor is turning, the less the restriction of the valve 23a to the passage of air, due to the taper 24a on the valve 23a, and to the action of atmospheric pressure thru ports 29a and 46. The above increase in vacuum applies to any given position of the throttle valve. The vacuum increases in the conduit 26a as the motor speed increases for any fixed setting of the throttle valve 33, and this feature provides for proper clutch contact after shifting the gears of the transmission at any speed.

The valve 23a controlling the capacity of the passage from port 34 to the passage 8b is not a necessary part of this system, and should be considered only as a refinement.

While the invention has been described with some detail, it is to be understood that the description is for the purpose of illustration only and is not to be construed as definitive of the limits of the inventive idea. The right is reserved to make such changes in the details of construction and arrangement of parts as will fall within the purview of the following claims.

What I claim as my invention is:

1. In an automatic control means for a motor vehicle, having a motor and an intake system, a clutch having means normally holding it in engaged position, a mechanism for controlling the acceleration of the motor, a pressure responsive means for releasing said clutch, means providing a passage between the intake system of the motor and said pressure responsive means, means operating when the motor is idling to open said passage whereby vacuum from said intake system actuates said pressure responsive means to release the clutch, means operating upon the actuation of said acceleration control mechanism to reduce the vacuum acting on said pressure responsive means whereby said clutch is moved toward engaged position, means responsive to pressure induced, as the clutch is moved toward engagement, by the force of said means normally holding the clutch in engaged position to arrest the motion of said clutch toward engagement at a predetermined drop in said pressure incident to the initial engagement of said clutch, and means operative to further modify the pressure acting on said pressure responsive means whereby clutch engagement is completed.

2. In an automatic control means for a motor vehicle, having a motor and an intake system, a clutch having means normally holding it in engaged position, a mechanism for controlling the acceleration of the motor, a pressure responsive member for releasing said clutch, means providing a passage between the intake system of the motor and said pressure responsive member, means operating when the motor is idling to open said passage whereby vacuum from said intake system actuates said pressure responsive member to release the clutch, means operating upon the actuation of said acceleration control mechanism to reduce the vacuum acting on said pressure responsive member whereby said clutch is moved toward engaged position, means responsive to pressure developed, as the clutch is moved toward engagement, on the opposite side of said member by said means normally holding the clutch in engaged position to arrest the motion of said clutch toward engagement upon the initial engagement of said clutch, and means operative to further modify the pressure acting on said member whereby clutch engagement is completed.

3. In an automatic control means for a motor vehicle, having a motor and an intake system, a clutch having means normally holding it in engaged position, a mechanism for controlling the acceleration of the motor, a pressure responsive member for releasing said clutch, means providing a passage between the intake system of the motor and said pressure responsive member, means operating, when the aforementioned mechanism is in its closed position, to open said passage whereby vacuum from said intake system actuates said pressure responsive member to release the clutch, means operating upon the actuation of said acceleration control mechanism to reduce the vacuum acting on said pressure responsive member whereby said clutch is moved toward engaged position, a valve responsive to pressure developed, as the clutch is moved toward engagement, on the opposite side of said member by said means normally holding the clutch in engaged position, said valve being operable to interrupt the motion of air allowing said clutch to move toward engaged position at a predetermined drop in pressure incident to the initial engagement of said clutch and means operative to further modify the pressure acting on said member whereby clutch engagement is completed.

4. In an automatic control means for a motor vehicle, having a motor and an intake system, a clutch having means normally holding it in engaged position, a mechanism for controlling the acceleration of the motor, means providing a passage connected to the intake system of the motor, a one-way check valve, a member for releasing said clutch responsive to suction in said passage and responsive to atmospheric pressure thru said one way check valve, a main valve in said passage operable to control communication between said passage and the intake system, and between said passage and the atmosphere, means operating, when the aforementioned mechanism is in its closed position, to actuate said main valve to open said passage to the intake system and release said clutch, means operating upon the actuation of said acceleration control mechanism to operate said main valve to close said passage from the intake system and open said passage to the atmosphere whereby said clutch is moved toward engaged position, a second one way check valve responsive to pressure developed, as the clutch is moved toward engagement, on the opposite side of said member for releasing the clutch by said means normally holding the clutch in engaged position, said second valve being operative to stop the motion of air allowing said clutch to move toward engaged position upon a predetermined drop in pressure acting on said member incident to the initial engagement of said clutch, and means operative to further modify the pressure acting on said member whereby clutch engagement is completed.

5. In an automatic control means for a motor vehicle, having a motor and an intake system, a clutch having means normally holding it in engaged position, a mechanism for controlling the acceleration of the motor, means providing a passage connected to the intake system of the motor, a one-way check valve, a member for releasing said clutch responsive to suction in said passage and responsive to atmospheric pressure thru said one way check valve, a main valve in said passage operable to control communication between said passage and the intake system, and between said passage and the atmosphere, means operating, when the aforementioned mechanism is in its closed position, to actuate said main valve to open said passage to the intake system and release said clutch, means operating upon the actuation of said acceleration control mechanism to operate said main valve to close said passage from the intake system and open said passage to the atmosphere whereby said clutch is moved toward engaged position, a second one way check valve responsive to pressure developed, as the clutch is moved toward engagement, on the opposite side of said member for releasing the clutch by said means normally holding the clutch in engaged position, said second valve being operative to arrest the motion of air allowing said clutch to move toward engaged position upon a predetermined drop in pressure acting on said member incident to the initial engagement of said clutch, means adjusting the pressure at which said second one way check valve closes, and means operative to further modify the pressure acting on said member whereby clutch engagement is completed.

6. In an automatic control means for a motor vehicle, having a motor and an intake system, a clutch having means normally holding it in engaged position, a mechanism for controlling the acceleration of the motor, means providing a passage connected to the intake system of the motor, a one-way check valve, a member for releasing said clutch responsive to suction in said passage and responsive to atmospheric pressure thru said one way check valve, a main valve in said passage operable to control communication between said passage and the intake system, and between said passage and the atmosphere, means operating upon the actuation of said acceleration control mechanism to operate said main valve to close said passage from the intake system and open said passage to the atmosphere whereby said clutch is moved toward engaged position, a second one way check valve responsive to pressure developed, as the clutch is moved toward engagement, on the opposite side of said member for releasing the clutch by said means normally holding the clutch in engaged position, said second valve being operative to arrest the motion of air allowing said clutch to move toward engaged position upon a predetermined drop in pressure acting on said member incident to the initial engagement of said clutch, and means operated by said acceleration control mechanism to provide a further relief of said pressure acting on said member to complete the engagement of said clutch.

7. In an automatic control means for a motor vehicle, having a motor and an intake system, a clutch having means normally holding it in engaged position, a mechanism for controlling the acceleration of the motor, means providing a passage connected to the intake system of the motor, a one-way check valve, a member for releasing said clutch responsive to suction in said passage and responsive to atmospheric pressure thru said one way check valve, a main valve in said passage operable to control communication between said passage and the intake system and between said passage and the atmosphere, means operating, when the aforementioned mechanism is in its closed position, to actuate said main valve to open said passage to the intake system and release said clutch, means operating upon the actuation of said acceleration control mechanism to operate said main valve to close said passage from the intake system and open said passage to the atmosphere whereby said clutch is moved toward engaged position, a second one way check valve responsive to pressure developed, as the clutch is moved toward engagement, on the opposite side of said member for releasing the clutch by said means normally holding the clutch in engaged position, said second valve being operative to stop the motion of air allowing said clutch to move toward engagement upon a predetermined drop in pressure acting on said member incident to the initial engagement of said clutch, and an auxiliary passage for further relieving the pressure acting on said member, said auxiliary passage increasing in capacity on the operation of said acceleration control mechanism, said auxiliary passage also being controlled in capacity by an auxiliary valve, said auxiliary valve being actuated by vacuum in the intake system of the motor of said vehicle at a point where vacuum is induced by the velocity of gas in said intake system, whereby said secondary valve increases the capacity of said auxiliary passage, when the throttle valve of said motor is open, as the motor speed increases.

8. In an automatic control means for a motor vehicle, having a motor and an intake system, a clutch having means normally holding it in engaged position, a mechanism for controlling the acceleration of the motor, means providing a passage connected to the intake system of the motor, a one-way check valve, a member for releasing said clutch responsive to suction in said passage and responsive to atmospheric pressure thru said one way check valve, a main valve in said passage operable to control communication between said passage and the intake system, and between said passage and the atmosphere, means operating, when the aforementioned mechanism is in its closed position, to actuate said main valve to open said passage to the intake system and release said clutch, means operating upon the actuation of said acceleration control mechanism to operate said main valve to close said passage from the intake system and open said passage to the atmosphere whereby said clutch is moved toward engaged position, an individual opening between the atmosphere and the side of said member opposite the one exposed to vacuum, said individual opening closing before the initial engagement of said clutch, a second one way check valve responsive to pressure developed, as the clutch is moved toward engagement, on the opposite side of said member for releasing the clutch by said means normally holding the clutch in engaged position, said second valve being operative to arrest the motion of air allowing said clutch to move toward engaged position upon a predetermined drop in pressure acting on said member incident to the initial engagement of said clutch, and means operative to further modify the pressure acting on said member whereby clutch engagement is completed.

9. In an automatic control means for a motor vehicle, having a motor and an intake system, a clutch having means normally holding it in engaged position, a mechanism for controlling the acceleration of the motor, means providing a passage connected to the intake system of the motor, a one-way check valve, a member for releasing said clutch responsive to vacuum in said passage on one face and responsive to atmospheric pressure thru said one way check valve on its opposite face, a main valve in said passage operable to control communication between said passage and the intake system and between said passage and the atmosphere, an auxiliary valve operable to control communication between the atmosphere and the side of said member exposed to vacuum, means operating when the motor is idling to open said passage to said member whereby said clutch is released, means operating upon the actuation of said acceleration control mechanism to actuate said main valve to close said passage from the intake system and open said passage to the atmosphere whereby said clutch is moved toward engaged position, an auxiliary passage from said opposite side of said member to said auxiliary valve, said auxiliary passage forming an outlet for the gas compressed by said member as the clutch moves toward engagement, said auxiliary valve being operable to close communication between the atmosphere and the side of said member exposed to vacuum, and restrict said auxiliary passage upon a predetermined drop in pressure incident to the initial engagement of said clutch, and means operating to further modify the pressure on said member whereby clutch engagement is completed.

10. In an automatic control means for a motor vehicle, having a motor and an intake system, a clutch having means normally holding it in engaged position, a mechanism for controlling the acceleration of the motor, means providing a passage connected to the intake system of the motor, a one-way check valve, a member for releasing said clutch responsive to vacuum in said passage on one face and responsive to atmospheric pressure thru said one way check valve on its opposite face, a main valve in said passage operable to control communication between said passage and the intake system and between said passage and the atmosphere, an auxiliary valve operable to control communication between the atmosphere and the side of said member exposed to vacuum, means operating when the motor is idling to open said passage to said member whereby said clutch is released, means operating upon the actuation of said acceleration control mechanism to actuate said main valve to close said passage from the intake system and open said passage to the atmosphere whereby said clutch is moved toward engaged position, an auxiliary passage from said opposite side of said member to said auxiliary valve, said auxiliary passage forming an outlet for the gas compressed by said member as the clutch moves toward engagement, said auxiliary valve being operable to close communication between the atmosphere and the side of said member exposed to vacuum, and restrict said auxiliary passage upon a predetermined drop in pressure incident to the initial engagement of said clutch, and means controlled by said acceleration control mechanism to provide auxiliary vacuum and air inlet connection to the side of said member exposed to vacuum, said vacuum connection decreasing in capacity and said air inlet increasing in capacity as said acceleration control mechanism is actuated to accelerate said motor.

11. In an automatic control means for a motor vehicle, having a motor and an intake system, a clutch having means normally holding it in engaged position, a mechanism for controlling the acceleration of the motor, means providing a passage connected to the intake system of the motor, a one-way check valve, a member for releasing said clutch responsive to vacuum in said passage on one face and responsive to atmospheric pressure thru said one way check valve on its opposite face, a main valve in said passage operable to control communication between said passage and the intake system and between said passage and the atmosphere, an auxiliary valve operable to control communication between the atmosphere and the side of said member exposed to vacuum, means operating when the motor is idling to open said passage to said member whereby said clutch is released, means operating upon the actuation of said acceleration control mechanism to actuate said main valve to close said passage from the intake system and open said passage to the atmosphere whereby said clutch is moved toward engaged position, an auxiliary passage from said opposite side of said member to said auxiliary valve, said auxiliary passage forming an outlet for the gas compressed by said member as the clutch moves toward engagement, said auxiliary valve being operable to close communication between the atmosphere and the side of said member exposed to vacuum, and restrict said auxiliary passage upon a predetermined drop in pressure incident to the initial engagement of said clutch, means adjusting said auxiliary valve to operate at various pressures, and means operating to further modify the pressure on said member whereby clutch engagement is completed.

12. In an automatic control means for a motor vehicle, having a motor and an intake system, a carburetor riser with a throttle valve therein, a clutch having means normally holding it in engaged position, a mechanism for controlling the acceleration of the motor, means providing a passage connected to the intake system of the motor, a one-way check valve, a member for releasing said clutch responsive to vacuum in said passage on the forward face and responsive to atmospheric pressure thru said one way check valve on the opposite face, a main valve in said passage operable to control communication between said passage and the intake system and between said passage and the atmosphere, an auxiliary valve operable to control communication between said passage and the atmosphere, and between said opposite side of said member and the atmosphere, a port in said carburetor riser exposed to vacuum in said intake system when said throttle valve is closed, resilient means operating to close said main valve, means transferring vacuum from said port allowing atmospheric pressure to open said valve, resilient means operating to close said auxiliary valve, means allowing vacuum to open said auxiliary valve, means allowing vacuum to release said clutch, means operating upon the actuation of said throttle valve to reduce the vacum acting on said main valve whereby said main valve closes said passage from the intake system, and opens said passage to the atmosphere thru said auxiliary valve whereby said clutch is moved toward engaged position, an auxiliary passage from said opposite face of said member to said auxiliary valve, said auxiliary passage transferring pressure created at said opposite face of said member by said means normally holding said clutch in engaged position to said auxiliary valve holding said valve open to complete a passage from said opposite face of said member to the atmosphere, means operating at a predetermined drop in pressure at said opposite face of said member incident to the initial engagement of said clutch to close said auxiliary valve whereby atmosphere is closed from said face of said member exposed to vacuum, and said auxiliary passage is restricted, and a connection from a port in said carburetor riser to the face of said member exposed to vacuum, said connection further decreasing the vacuum acting on said member, as said throttle valve is opened.

13. In an automatic control means for an automotive vehicle, having a motor and an intake system, a clutch having means normally holding it in engaged position, a mechanism for controlling the acceleration of the motor, means providing a passage connected to the intake system of the motor, a one-way check valve, a member for releasing said clutch responsive to vacuum in said passage on one face and responsive to atmospheric pressure thru said one way check valve on its opposite face, a main valve in said passage operable to control communication between said passage and the intake system and between said passage and the atmosphere, an auxiliary valve operable to control communication between the atmosphere and the side of said member exposed to vacuum, means operating when the motor is idling to open said passage to said member whereby said clutch is released, means operating upon the actuation of said acceleration control mechanism to actuate said main valve to close said passage from the intake system and open said passage to the atmosphere whereby said clutch is moved toward engaged position, an auxiliary passage from said opposite side of said member to said auxiliary valve, said auxiliary passage forming an outlet for the gas compressed by said member as the clutch moves toward engagement, said auxiliary valve being operable to close communication between the atmosphere and the side of said member exposed to vacuum, and restrict said auxiliary passage upon a predetermined drop in pressure incident to the initial engagement of said clutch, means adjusting said auxiliary valve to operate at various pressures, means operating to further modify the pressure on said member whereby clutch engagement is completed, and means operative by vacuum in said intake system at a point where vacuum is induced by the velocity of gas in said intake system to further control the capacity of said connection.

14. In an automatic control means for a motor vehicle, having a motor and an intake system, a carburetor riser with a throttle valve therein, a clutch having means normally holding it in engaged position, a mechanism for controlling the acceleration of the motor, means providing a passage connected to the intake system of the motor, a one-way check valve, a member for releasing said clutch responsive to vacuum in said passage on the forward face and responsive to atmospheric pressure thru said one way check valve on the opposite face, a main valve in said passage operable to control communication between said passage and the intake system and between said passage and the atmosphere, an auxiliary valve operable to control communication between said passage and the atmosphere and between said opposite side of said member and the atmosphere, a port in said carburetor riser exposed to vacuum in said intake system when said throttle valve is closed, resilient means operating to close said auxiliary valve, means allowing vacuum to open said auxiliary valve, means allowing vacuum to release said clutch, means operating upon the actuation of said throttle valve to reduce the vacuum acting on said main valve whereby said main valve closes said passage from the intake system and opens said passage to the atmosphere through said auxiliary valve whereby said clutch is moved toward engaged position, an auxiliary passage from said opposite face of said member to said auxiliary valve, said auxiliary passage transferring pressure created at said opposite face of said member by said means normally holding said clutch in engaged position, to said auxiliary valve holding said valve open to complete a passage from said opposite face of said member to the atmosphere, means operating at a predetermined drop in pressure at said opposite face of said member incident to the initial engagement of said clutch to close said auxiliary valve whereby atmosphere is closed from said face of said member exposed to vacuum and said auxiliary passage is restricted, and a connection from said port in said carburetor riser to the face of said member exposed to vacuum, said connection further decreasing the vacuum acting on said member as said throttle valve is opened, and means operative on the actuation of said throttle valve to control the vacuum acting in said connection at the time said main valve opens to release said clutch.

15. In a system of the class described, a clutch having parts movable into and out of clutching engagement with each other, means normally holding said clutch parts in engagement with each other, pressure responsive means for moving said clutch parts out of engagement with each other, means for supplying vacuum to said pressure responsive means to cause the same to move said clutch parts to disengaged position, means for releasing the vacuum acting on said pressure means whereby said first mentioned means moves said clutch parts toward clutching engagement with each other, means responsive to the pressure induced by the force of said means moving said clutch parts toward engagement whereby the movement of gas compressed by said pressure responsive means is restricted at the initial engagement of said clutch parts.

16. In a clutch control mechanism for an automotive vehicle, a double-ended pressure differential operated motor having two separate compartments therein, valve means for controlling the clutch disengaging and engaging operations of said motor comprising a three-way valve operable to control the gaseous pressure of one compartment of said motor, and further comprising a pressure differential operated valve operable in accordance with the gaseous pressure of the other compartment of said motor and in part operative to control the gaseous pressure of said other compartment.

17. In a clutch control mechanism for an automotive vehicle provided with a clutch having driving and driven elements, and means for biasing said elements into driving engagement one with another, a double-ended pressure differential operated motor having end compartments therein, valve means for controlling the clutch disengaging and engaging operations of said motor comprising a three-way valve operable to control the gaseous pressure of one compartment of said motor, and further comprising a pressure differential operated valve, operable in accordance with the gaseous pressure of the other compartment of said motor, for controlling the gaseous pressure of said other compartment of the motor, said latter valve being automatically operative, when the clutch plates contact during the engagement of the clutch, to substantially modify the clutch engaging operation of said motor.

RALPH S. WHITTINGTON.